US005562074A

United States Patent [19]

Koch

[11] Patent Number: 5,562,074

[45] Date of Patent: Oct. 8, 1996

[54] PISTON FOR INTERNAL-COMBUSTION ENGINES

[75] Inventor: Alfred Koch, Weissach, Germany

[73] Assignee: Dr.Ing. h.c.F. Porsche AG, Germany

[21] Appl. No.: 536,184

[22] Filed: Sep. 29, 1995

[30] Foreign Application Priority Data

Sep. 30, 1994 [DE] Germany .......................... 44 34 994.7

[51] Int. Cl.[6] .............................. F02F 3/02; F02F 3/16; F16J 1/00

[52] U.S. Cl. .............................. 123/193.6; 92/239

[58] Field of Search .............................. 123/193.6, 193.4; 92/239

[56] References Cited

U.S. PATENT DOCUMENTS

| | | | |
|---|---|---|---|
| 1,960,313 | 5/1934 | Long | 92/239 |
| 4,377,967 | 3/1983 | Pelizzoni . | |
| 4,593,660 | 6/1986 | Elsbett et al. | 123/193.6 |
| 4,683,808 | 8/1987 | Wacker et al. | 92/239 |
| 4,730,549 | 3/1988 | Pfeiffenberger | 92/239 |
| 5,076,225 | 12/1991 | Tokoro et al. . | |
| 5,331,932 | 7/1994 | Watanabe et al. | 123/193.6 |
| 5,408,916 | 4/1995 | Gorsky et al. | 123/193.6 |

FOREIGN PATENT DOCUMENTS

| | | |
|---|---|---|
| 0171825A1 | 2/1986 | European Pat. Off. . |
| 0385390A1 | 9/1990 | European Pat. Off. . |
| 2458685 | 1/1981 | France . |
| 711937 | 9/1941 | Germany . |
| 4109160C2 | 9/1992 | Germany . |
| 4338571A1 | 5/1994 | Germany . |

*Primary Examiner*—Marguerite McMahon
*Attorney, Agent, or Firm*—Evenson, McKeown, Edwards & Lenahan, P.L.L.C.

[57] ABSTRACT

A piston for an internal-combustion engine has two webs respectively between the piston shaft and the pin eyes displaced toward the inside thereof. In order to achieve sufficient stability and rigidity, as well as a low-wear moldability one of the webs between the pin eye and the shaft wall is displaced toward the outside. Misarrangement also provides good accessibility for splash oil cooling.

9 Claims, 2 Drawing Sheets

PISTON FOR INTERNAL-COMBUSTION ENGINES

BACKGROUND AND SUMMARY OF THE INVENTION

The present invention relates to a piston for internal-combustion engines, and more particularly, to a piston for an internal-combustion engine comprising essentially circular cylinder liners, a piston bottom and a piston shaft closed at least along a portion of its axial length in the circumferential direction with pin eyes set back with respect to the diameter of the piston shaft, and mutually opposite webs between the pin eyes and the shaft wall.

DE 41 09 160 C2 shows a known piston constructed asymmetrically with respect to the pin axis in order to achieve a high elasticity while utilizing the lightweight construction and in order to avoid a stress concentration. The pulled-down portion of the shaft wall extends along a larger angle at the circumference than the pulled down portion of the shaft wall of the counter-pressure side. Curved webs extend respectively between the shaft wall and the indented pin eyes. The webs are displaced to the outside relative to the counter-pressure side on the pressure side of the piston. The entire piston construction is mirror-symmetrical with respect to a plane perpendicular to the pin axis.

It is an object of the present invention to develop a piston for internal-combustion engines such that it has a bottom surface which is easily accessible for a cooling, high stabilities and sufficient rigidity and can be manufactured by conventional processes in an easy manner and at reasonable cost. This piston is suitable for high to very high compressions and very high engine powers with the combustion space and piston temperatures being correspondingly high.

According to the present invention, this object has been achieved by providing that the piston is forged, and arranged in the internal-combustion engine to be splash oil cooled, one of the webs between the one pin eye and the shaft wall is displaced outwardly relative to the opposite web applied to the one pin eye, and the two webs of the other pin eye are spaced equidistantly from a center plane perpendicularly to a pin axis.

By producing the piston as a forged component, a high-strength, highly loadable, stiff piston is constructed by processes known per se. A good elimination of heat becomes possible by using a splash oil cooling which acts upon the piston bottom. By displacing one of the webs between the pin eye and the shaft wall toward the outside, a good accessibility of the piston bottom is permitted for the oil splash. When the splash oil cooling and the corresponding bore is arranged in one of the bearing seats of the crankshaft, this web which is displaced to the outside is situated above the corresponding bore.

By replacement of the web, a relatively large bottom surface for the splash oil cooling is made available. Moreover, the displacement of the web toward the outside permits a free accessibility of the oil splash without any impairment of the stability or rigidity of the piston. The one-sided displacement of one of the webs permits maintenance of relatively large shaped-out areas as a result of which a forging operation becomes possible without any excess wear.

The rigidity and the stability of the piston are advantageously increased, in accordance with the present invention because the webs not placed to the outside are connected with the pin eye in a center area of the latter. This arrangement results in geometrically favorable conditions on the pin eye which, on the one hand, permit in a simple manner a connection required for the stability and, on the other hand, permit almost balanced lever conditions on the pin eye.

With respect to the rigidity and stability of the piston, it is advantageous for the webs to extend almost in a straight line inasmuch as a result, the spring effect because of the shaping is avoided.

For the rigidity and stability of the piston, it is also advantageous to lead the webs away from the pin eye approximately at a right angle, that is, at an angle of between approximately 80 and 100 degrees.

With a view to a frictional output which is as low as possible, it is advantageous for pulled-down shaft sections to extend between the pin eye which lead away from the closed piston shaft and which permit a sufficient guiding of the piston.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
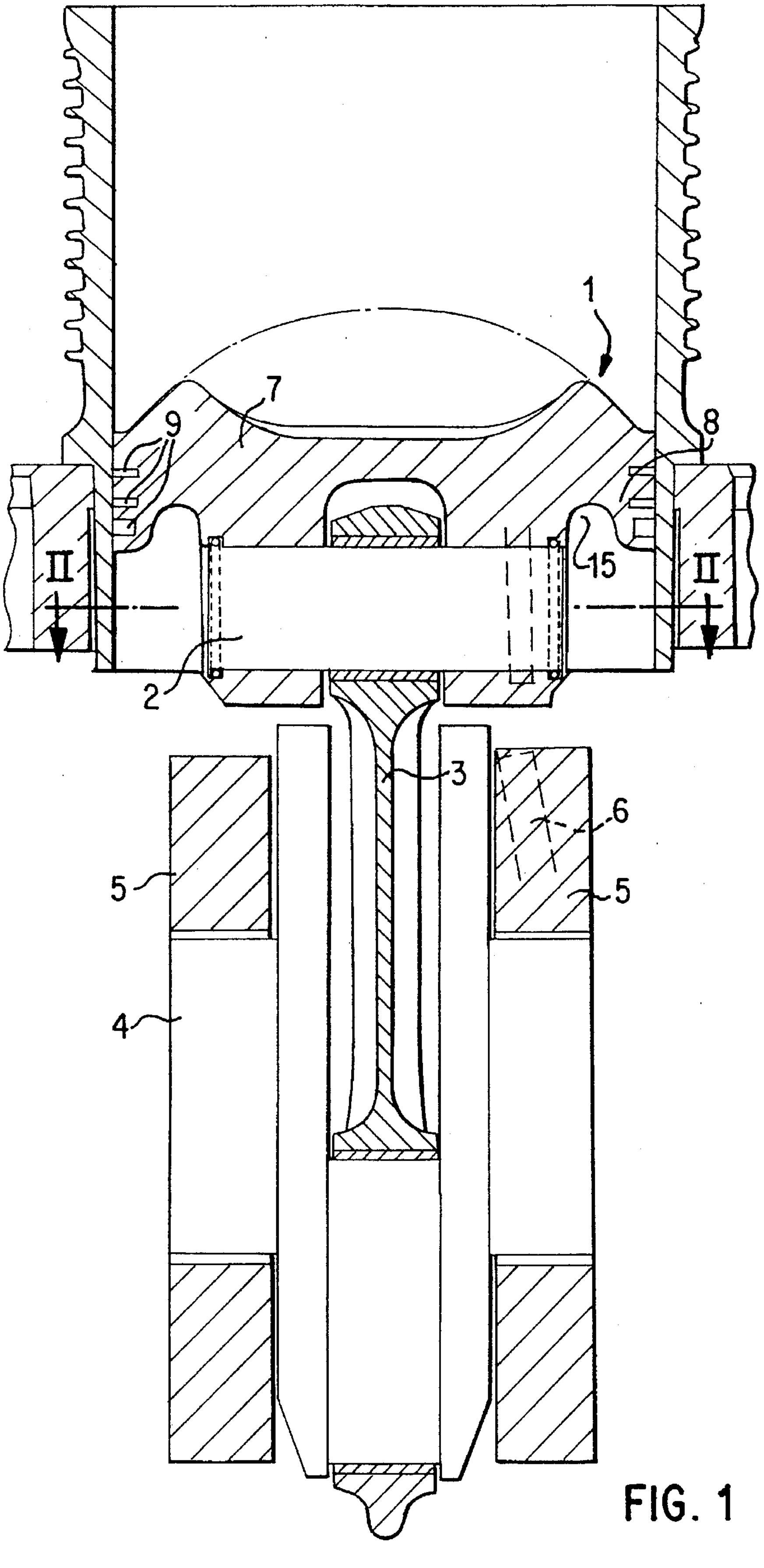
FIG. 1 is a cross-sectional elevational view of a piston according to the invention with a connecting rod and parts of the crankshaft as well as their bearing.
Figure 2:
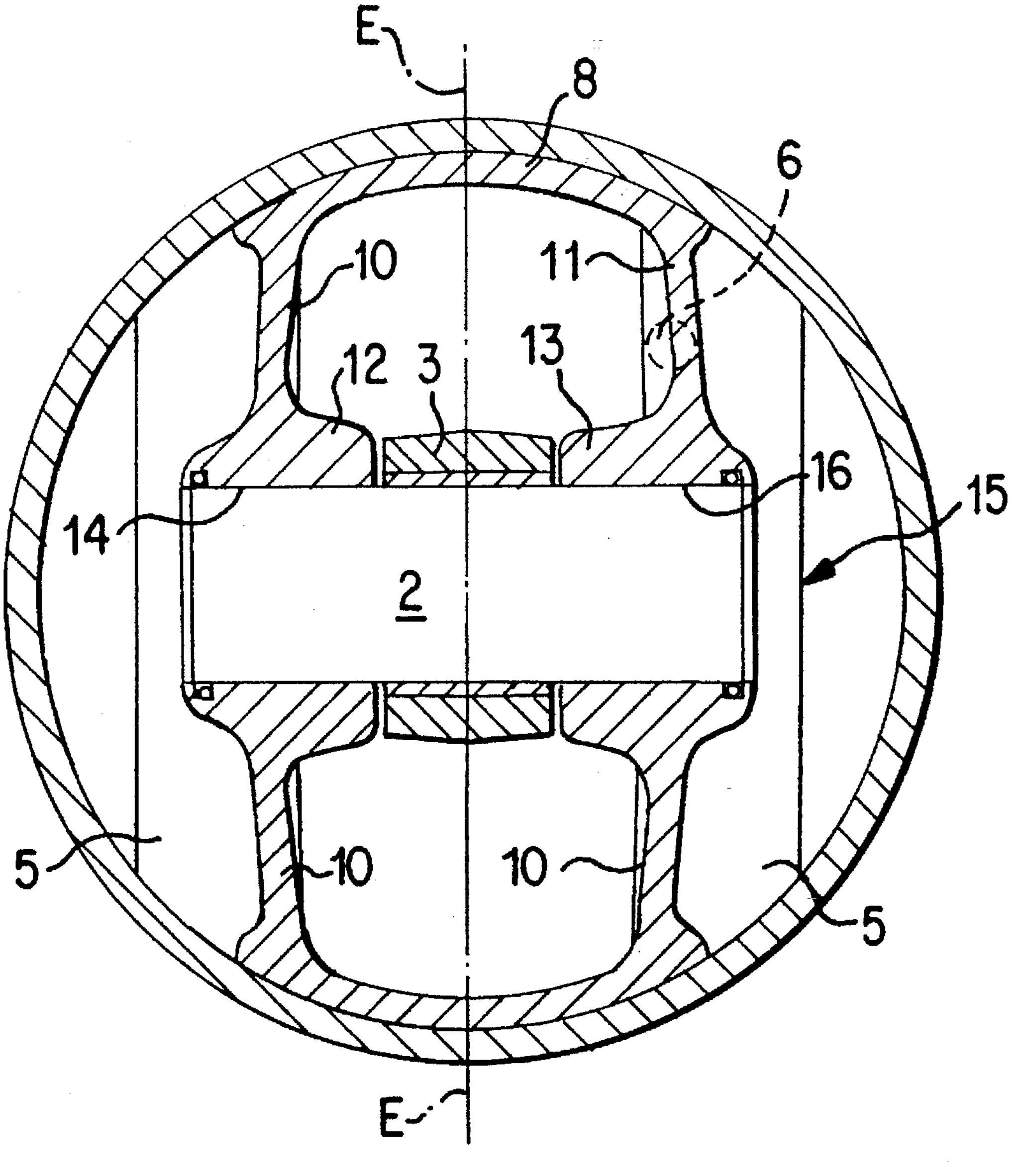
FIG. 2 is a sectional view of a piston along line II—II of FIG. 1.

FIGS. 1 and 2 show a piston designated generally by numeral 1 which is connected with the connecting rod 3 of an internal-combustion engine by way of a known pin 2. The connecting rod 3 is connected with a crankshaft 4 which is disposed in bearing seats 5. In one of the two bearing seats 5 arranged on both sides of the connecting rod, a splash oil bore 6 is constructed which is illustrated by broken lines and which is connected with the oil supply of the internal-combustion engine. This splash oil bore 6 sprays oil onto the interior side of the piston bottom 7 for cooling the piston 1 during the operation of the internal-combustion engine.

Starting from its piston bottom 7, the piston 1 has a surrounding piston shaft 8 which is closed in the circumferential direction and has three surrounding grooves 9 for receiving conventional piston rings or oil control rings (not shown). Four webs 10, 11 extend out from the piston shaft, of which two respectively are situated opposite one another and are connected with a pin eye 12, 13. The two pin eyes 12, 13 are provided with aligned bores 14 for receiving the pin 2.

The pin eye 13 illustrated on the right in FIG. 2, in the installed condition of the internal-combustion engine, is situated on the same side of the connecting rod 3 as the bearing support 5 which is assigned to the corresponding piston and is provided with the splash oil bore 6. The splash oil bore 6 is spaced from the longitudinal axis of the crank shaft; that is, the bore 6 is situated off-center. The web 11 between the pin eye 13 and the piston shaft 8, which is arranged above this splash oil bore 6, is displaced outwardly with respect to a plane E perpendicular to the longitudinal axis of the pin or of the bores 14. The three other webs are spaced at least approximately the same distance relative to this plane E. The displacement of the web 11 in FIG. 2 is demonstrated by its position with respect to the bearing support 5.

Displacement of this web 11 toward the outside permits a better accessibility of the piston bottom 7 to the oil spray of the splash oil cooling. Because only one of the two webs 10, 11 is displaced to the outside, a space 15 remains between the pin eye 13, the two webs 10 and 11 and the shaft wall which is large enough for a low-wear reception or removal of the forging tool. This space 15, which is covered by the piston bottom 7, is formed by the webs 10, 11, the pin eye 13 and the connecting part of the shaft wall 8.

For a better guidance of the piston in the cylinder bore, the piston shaft 8 is lengthened on two opposite sides in each case between the pin eyes 12, 13.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A piston for an internal-combustion engine comprising essentially circular cylinder liners, a piston bottom and a piston shaft closed at least along a portion of its axial length in the circumferential direction with pin eyes set back with respect to the diameter of the piston shaft, and mutually opposite webs between the pin eyes and the shaft wall, wherein the piston is forged, and arranged in the internal-combustion engine to be splash oil cooled, one of the webs between one pin eye and the shaft wall is displaced outwardly relative to the opposite web applied to the one pin eye, and the two webs of the other pin eye are spaced equidistantly from a center plane perpendicular to the pin axis.

2. The piston according to claim 1, wherein the webs which are arranged so as not to be displaced toward the outside are connected with the pin eyes in a central area thereof.

3. The piston according to claim 1, wherein the webs extend in at least approximately a straight line.

4. The piston according to claim 2, wherein the webs extend in at least approximately a straight line.

5. The piston according to claim 1, wherein the webs extend from the pin eyes approximately at a right angle.

6. The piston according to claim 2, wherein the webs extend from the pin eyes approximately at a right angle.

7. The piston according to claim 3, wherein the webs extend from the pin eyes approximately at a right angle.

8. The piston according to claim 6, wherein the webs extend in at least approximately a straight line.

9. The piston according to claim 1, wherein between the pin eyes, shaft sections extend from the closed piston shaft.

* * * * *